United States Patent [19]
Masato et al.
[11] Patent Number: 4,807,366
[45] Date of Patent: Feb. 28, 1989

[54] COMPACT CHAIN SAW

[75] Inventors: Honsho Masato; Hanahusa Toru, both of Himeji, Japan
[73] Assignee: Fuji Blade Co., Ltd., Hyogo, Japan

[21] Appl. No.: 890,018
[22] PCT Filed: Dec. 3, 1985
[86] PCT No.: PCT/JP85/00664
§ 371 Date: Jul. 24, 1986
§ 102(e) Date: Jul. 24, 1986
[87] PCT Pub. No.: WO86/03447
PCT Pub. Date: Jun. 19, 1986

[30] Foreign Application Priority Data

| | | | |
|---|---|---|---|
| Dec. 5, 1984 | [JP] | Japan | 59-255643 |
| Dec. 5, 1984 | [JP] | Japan | 59-255644 |
| Dec. 5, 1984 | [JP] | Japan | 59-255645 |
| May 20, 1985 | [JP] | Japan | 59-75269 |
| Sep. 13, 1985 | [JP] | Japan | 60-141169 |
| Sep. 13, 1985 | [JP] | Japan | 60-141170 |
| Sep. 13, 1985 | [JP] | Japan | 60-141171 |

[51] Int. Cl.$^4$ ..................... B23D 57/02; B27B 17/08
[52] U.S. Cl. ..................................... 30/383; 30/381; 83/830
[58] Field of Search .............................. 30/381, 383; 83/830–834

[56] References Cited

U.S. PATENT DOCUMENTS

| | | | |
|---|---|---|---|
| 2,446,774 | 8/1948 | Mall | 83/831 X |
| 2,801,653 | 8/1957 | Van Wagner | 83/831 |
| 2,984,269 | 5/1961 | Gates | 83/831 |
| 3,039,502 | 6/1962 | Spivey | 30/383 X |
| 4,414,876 | 11/1983 | Loigerot | 30/381 X |
| 4,464,964 | 8/1984 | Alexander | 30/383 X |

FOREIGN PATENT DOCUMENTS

| | | | |
|---|---|---|---|
| 1102721 | 5/1955 | France | 83/830 |
| 268249 | 8/1950 | Switzerland | 83/830 |

*Primary Examiner*—Frank T. Yost
*Assistant Examiner*—Michael D. Folkerts
*Attorney, Agent, or Firm*—Birch, Stewart, Kolasch & Birch

[57] ABSTRACT

A compact chain saw capable of cutting relatively hard materials and suitable for field work having a saw chain with cutting links each provided with a plurality of teeth having cutting edges thereon and driving notches provided on base portions of the cutting links to be held and pivotally supported by pairs of side links. The cutting edges are displaced in the lateral direction with the base portions of the cutting links in sliding contact with bottom portions (inner peripheral edges) of the guide grooves, and the pairs of side links riding on both side edges of the guide grooves, whereby the saw chain being rotatingly driven is restricted from pivot action and side-run phenomenon during cutting.

4 Claims, 4 Drawing Sheets

COMPACT CHAIN SAW

FIELD OF THE INVENTION

The present invention relates to a compact chain saw suitable for cutting relatively hard synthetic resin materials, metal materials, lightweight concrete materials and the like.

A rotating circular saw, a reciprocating jigsaw or a band saw driven by a pair of rotors have hitherto been utilized for cutting relatively hard synthetic resin materials, metal materials and the like. However, the band saw is disadvantageously too large-sized for field work. The rotating circular saw or reciprocating jigsaw are presently mainly used in field work while a hand saw is still generally used as a handy device in the existing circumstances. With the circular saw, however, not only is the cutting depth limited by the radius of the circular saw, but it cannot clearly perform so-called cutting-off of slabs, whereby the range of its use is limited. With the jigsaw, on the other hand, not only is the cutting efficiency is deteriorated due to a mechanism of converting rotating motion of a motor into a reciprocating motion, but it is difficult to make its driving portion compact and the cutting depth is limited by the interval of its reciprocating motion. Further, although slab cutting-off is easier than with the circular saw, there remains the inconvenience of forming an introduction hole for cutting in advance.

Therefore, application of chain saw is proposed in order to compactly and provide simplicity of operation of the present saw to thereby enable easy performance of slab cutting-off etc. for cutting relatively hard synthetic resin materials, metal materials or the like. The conventional chain saw put into practice has been improved mainly with soft timber as the object to be cut (for example, U.S. Pat. No. 392,904), and hence the same is not suitable for practical cutting for the reason that, so far as such chain saw construction is utilized, teeth break, cracks are easily formed in the materials being cut such as relatively hard synthetic resin materials, metal materials, lightweight concrete materials and the like and vibration is excessive.

OBJECT OF THE INVENTION

An object of the present invention is to provide a compact chain saw suitable for cutting relatively hard synthetic resin materials, metal materials, lightweight concrete materials and the like.

Another object of the present invention is to restrict pivot actions and side-run phenomenons of the saw chain during cutting and provide a compact chain saw excellent in durability.

Still another object of the present invention is to provide a compact chain saw capable of cutting off slab materials.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are give by way of illustration only, and thus are not limitative of the present invention, and wherein.

DETAILED DESCRIPTION OF THE PREFERRED EMBODIMENTS

Figure 1:
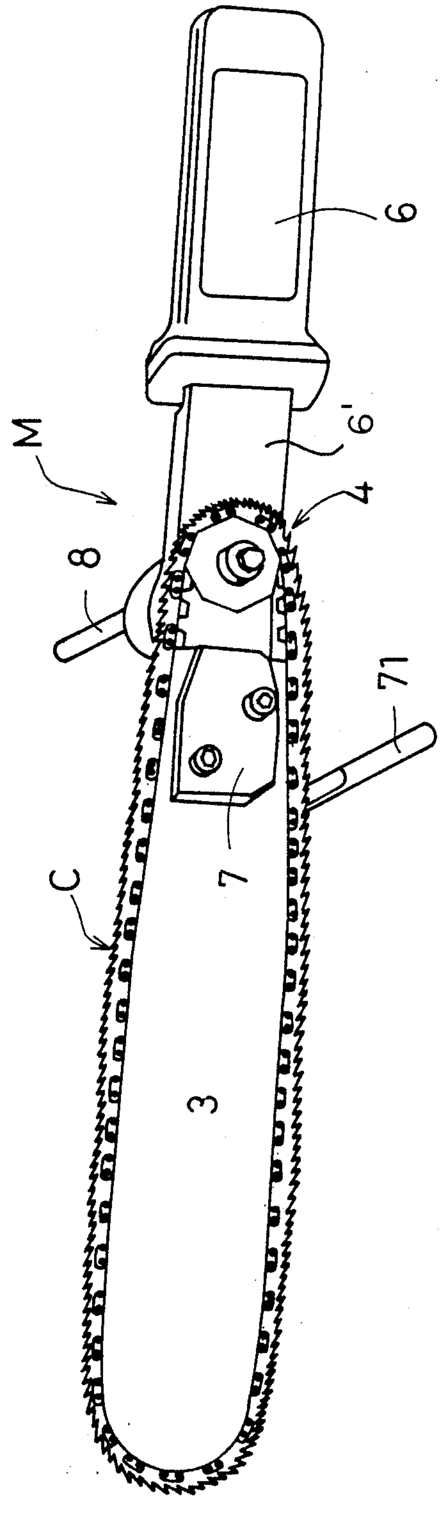
FIG. 1 is a perspective view of the compact chain saw according to the present invention.

In the drawings, symbol M indicates the compact chain saw of the present invention, which is formed by an endlessly extending saw chain C. The saw chain C is provided with an even number of cutting links having a predetermined number of cutting edges pivotally connected together by pins P centered between pairs of side links 2,2. The saw chain C is positioned on a guide bar 3 so that tooth portions 41 of a chain sprocket 4 are engaged in notches 12 formed in bases of the cutting links 1 to be rotatably driven.

Figure 2:
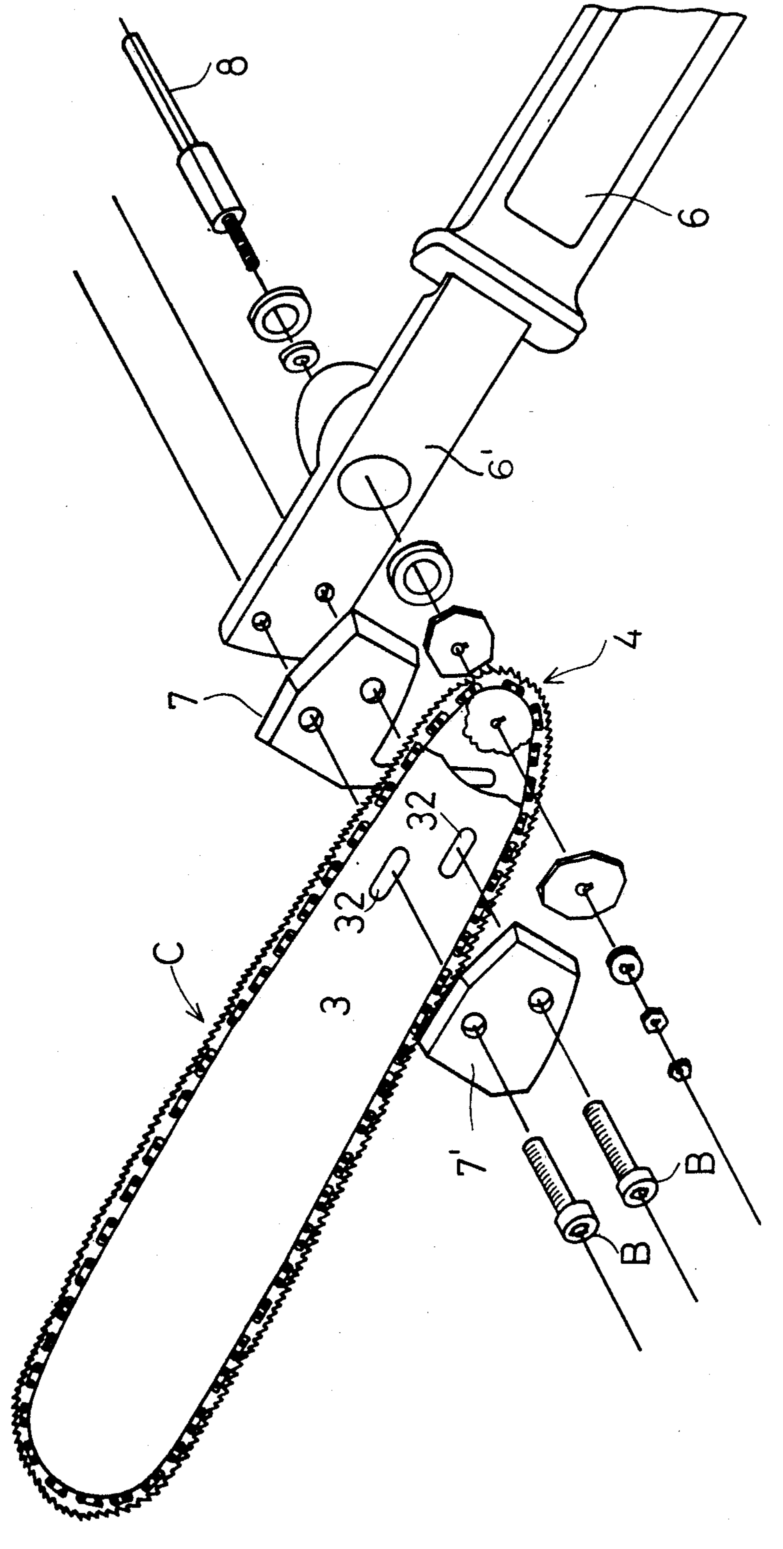
FIG. 2 is a perspective view of a disassembled compact chain saw according to the present invention.

As shown in FIG. 2, such a chain saw M is assembled in such a manner that the saw chain C is mounted on a projecting forward end of a handle 6 by bolts B, B so that slots 32, 32 of the guide bar 3 are held between a first clamping plate having a downwardly extending guide rod 71 serving as a guide member for cutting and a second clamping plate 7′ having no guide bar. The tension of the saw chain C is adjustable by the bolts B, B. The components of the chain sprocket 4 are keyway-connected with a driving shaft 8 mounted on a bearing postioned at the center of support 6′ including handle 6 to be rotatably driven by a motor which is not shown in the drawings.

As shown in FIGS. 1 and 2, the forward end portion of the guide bar 3 is arcuately shaped similarly to a conventional chain saw, while guide grooves 31 for guiding the saw chain C are formed at the periphery of the guide bar 3. The chain sprocket 4 is arranged on the base portion side of the guide bar 3, to be mounted on the driving shaft 8 which is interlockingly connected with a rotation driving device such as a motor not shown in the drawings etc. mounted on the support 6′ including handle 6.

The saw chain C is endlessly formed as a whole with the plurality of cutting links 1 disposed between pairs of side links 2. The side links 2 are extremely thin in comparison with the cutting links 1 and pivotally connect the same with each other by the pins P located at portions upwardly displaced from the vertical central position of each cutting link 1. A pair of adjacent cutting links 1, 1 are so set that a plurality of teeth 11L, 11L′, 11C, 11R, 11R′ having cutting edges on each said cutting center link 1 arranged laterally across the center link 1 to clear the full width of the chain saw. The cutting edges are directed in opposite directions to be horizontally laterally symmetrical with each other between pairs of adjacent links 1, 1 with the first cutting edge 11 being continuous with the last cutting 11 of the front center link 1.

Figure 3:
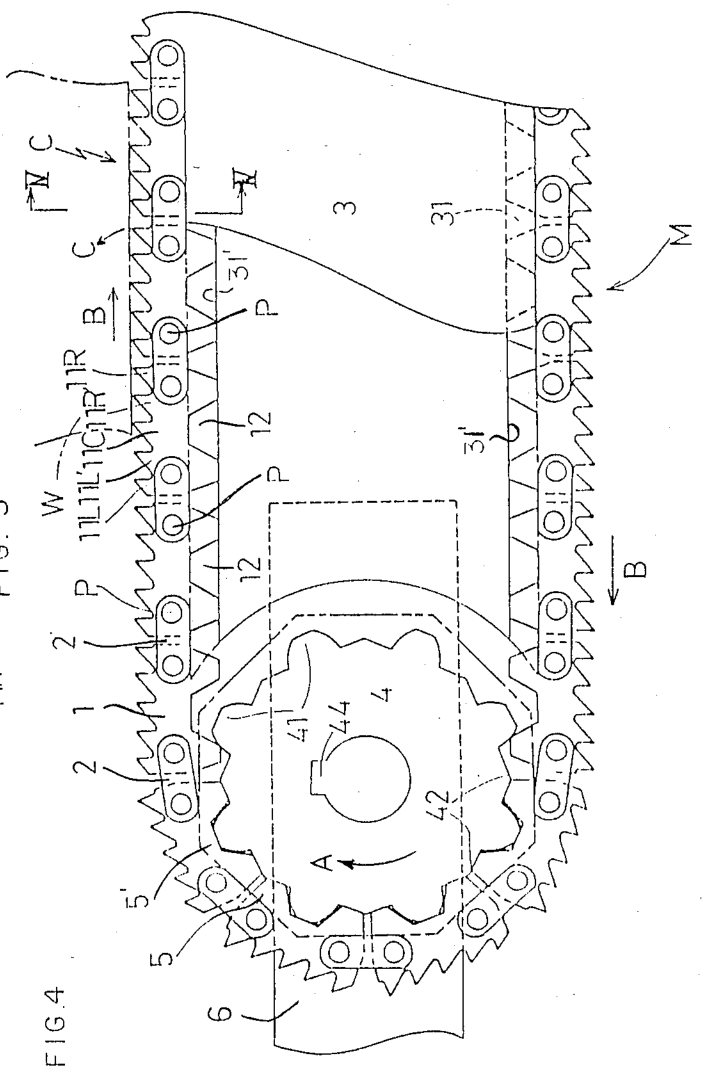
FIG. 3 is a side view of a portion of the chain saw shown in FIG. 1 showing details of its structure.
Figure 4:
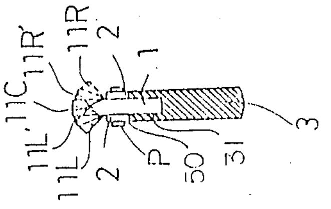
FIG. 4 is a cross-sectional view taken along the line IV—IV in FIG. 3.

In more detail, as shown in FIG. 3, a predetermined number (five in the figure) of a series of teeth 11R, 11R′, 11L′, 11L having cutting edges of a front center link 1 are set by twos gradually increasingly extending in the lateral direction about center tooth 11C having a cutting edge. The series of teeth 11L, 11L′, 11R′, 11R are set in twos gradually increasingly extending in the left direction about center tooth 11C having a central cutting edge positioned at the center of the center links 1 (FIGS. 4 and 5), so that the saw chain C is provided with edge pitches at regular intervals as a whole.

Further, the plurality of teeth 11R–11L on each respective cutting center link 1 are set in a zigzag manner between the front and rear adjacent centers links 1, 1 so that the cutting cycle is repeated. The arrangement of the setting of the plurality of cutting edges between the front and rear cutting center links 1, 1 is so arranged that the last cutting edge 11R or 11L of the front cutting center link is continuous with the first cutting edge 11R or 11L of the rear cutting center link, to naturally shift to a subsequent cutting edge.

The base sides of the cutting links 1 are flat as a whole, and the central portions thereof are formed with notches 12 with which tooth portions 41 of the chain sprocket 4 engage. Thus, the tooth portions 41 of the chain sprocket 4 engage with the base notches 12 of the cutting center links whereby the saw chain C is rotatably driven in the arrow A direction, to travel in the arrow B direction. The cutting links 1 are pivotally connected to pairs of side links 2 which are extremely thin in comparison with the cutting links 1, and hence the strength of the saw chain C is not sufficient in the torsional direction and tends to fluctuate in the lateral horizontal direction, whereas the lower end portions of the center links 1 are held and guided by the guide grooves 31 of the guide bar 3. The pairs of side links 2 travel while riding on both side edges 50 of the guide grooves 31, and hence travel with restriction preventing lateral horizontal fluctuation. When performing cutting of a material, the preceding cutting edges 11R of the cutting links 1 bite into the material and the cutting links 1 tend to pivot. The base portions of the cutting links 1 slidingly move in contact with the bottom portions (inner peripheral edges 31′) of the guide grooves 31 and the pairs of side links 2 slidably move riding on both side edges 50 of the guide grooves 31 while portions pivotally connected with the side links 2 are displaced toward the cutting edge sides, whereby pivoting of the cutting links 1 is restricted.

Further, in order to prevent lateral horizontal fluctuation during rotation driving of the saw chain C by the chain sprocket 4 to permit transmission of driving force while realizing smooth shifting of the saw chain C from the chain sprocket 4 to the guide bar 3, polygonal guide plates 5, 5 are mounted to driving shaft 8 on both sides of the said chain sprocket 4. The polygonal guide plates 5, 5 are rotated in synchronization with the chain sprocket 4 such that the edges thereof are in contact with the lower side surfaces of the pairs of side links 2. The edges of the saw chain engage with the chain sprocket to rotatably drive the saw chain C while guiding portions close to the base notches 12 of the cutting links 1 engage with the tooth portions of the chain sprocket 4 by both guide plates 5. The shape of bottom portions 42 located between respective tooth portions 41, 41 of the chain sprocket 4 correspond to the flat base portions of the cutting links 1 engaged with the chain sprocket 4. The bottom portions 42 are set at an angle relative each other as shown in FIG. 3.

The following Table illustrates a comparison of a preferred definite example of the chain saw according to the present invention with the link size of a conventional chain saw for timber:

Link Size Comparison Table

| | Invention | Prior Art Example |
|---|---|---|
| Cutting Width (Tooth Width) | 1.95–2.00 mm | 7.50 mm |
| Edge Pitch | 1.4–1.7 mm | 25 mm |
| Edge Number/Link | 5–7 | 1 |
| Thickness of Center Link | 0.55–0.72 mm | 1.0–1.2 mm |
| Thickness of Side Link | 0.2–0.3 mm | 1.2–1.3 mm |
| Full Height of Center Link | 6 mm | 14 mm |
| Height of Exposed Link to Guide Bar | 4 mm | 9.7 mm |
| Hardness of Link | around HRC62–65 | around 50 |

It is important to restrict pivot action and generation of side-run torques of the saw chain in cutting for ensuring durability of the saw chain pivotally connected by pins, in order to make the same compact and capable of cutting relatively hard synthetic resin materials, metal materials and the like.

The cutting links are connected through driving links in a one-cutting link/one-edge manner, as in a conventional saw chain for timber, the driving notches are provided between the flat base portions of the cutting links instead of omitting the driving links, with the cutting links being pivotally connected to form a saw chain and decrease edge pitches thereby to restrict pivot action.

The cutting links are disposed as center links between pairs of side links to place work cutting points at the center with the center links of the saw chain being driven to travel. Holding and guiding of the center links by the guide grooves of the guide bar and guide plates of the chain sprocket restrict side run, to thereby achieve the objects of the present invention.

Namely, the present invention has the following three main structural features:

(1) an endless saw chain provided with a plurality of teeth having cutting edges on its upper end portion and the cutting links being formed with flat base portions slidably disposed on the guide bar and formed with driving notches which engage with the chain sprocket, the center links are disposed between pairs of side links and pivotally connected by pins;

(2) the guide bar for guiding the saw chain is formed with a guide groove, the cutting link lower end flat base portions of the saw chain being in contact with the inner peripheral edge of the guide groove for facilitating sliding movement, the pairs of side links riding on both side edges of the guide groove for also facilitating sliding movement; and (3) the chain sprocket holds and guides portions lower than positions pivotally connecting the center cutting links of the saw chain with the side links, and a pair of guide plates rotating with the chain sprocket are provided.

Further, preferably, the positions pivotally connecting the center cutting links of the saw chain with the side links by pins are arranged to be higher than the vertical central height of the center links. This arrangement restricts the pivot action of the saw chain.

Figure 5:
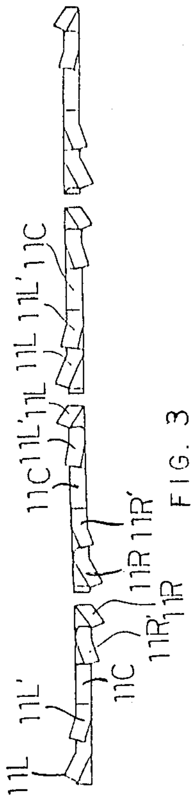
FIG. 5 is an edge view of the saw chain component of the present invention having a particular mode of saw-tooth setting.

Further, saw-tooth setting modes for the plurality of cutting edges on the center links are deeply related with parting durability of the saw chain. Particularly workload and working positions of first edges (first cutting edges) on the center links have important meaning. Therefore, the saw-tooth setting is preferably performed, as a first mode, as shown in FIG. 5, such that:

a plurality of teeth 11R–11L having cutting edges on each center cutting link 1 have cutting edges that cross the center link 1 to clear the full width of the chain saw while the same are set in opposite lateral directions to be horizontally symmetrical with each other between front and rear adjacent links 1 to balance working positions of respective edges through the link as a whole, while the saw-tooth setting is so performed that the cutting edge of the first tooth 11R or 11L is continuous with the last cutting edge of the tooth 11R or 11L of the front center link 1, to restrict the workload of the first edge.

Figure 6:
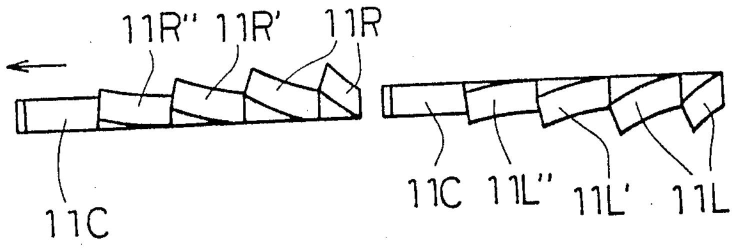
FIG. 6 is an edge view of another mode of saw-tooth setting of the saw chain.
Figure 7:
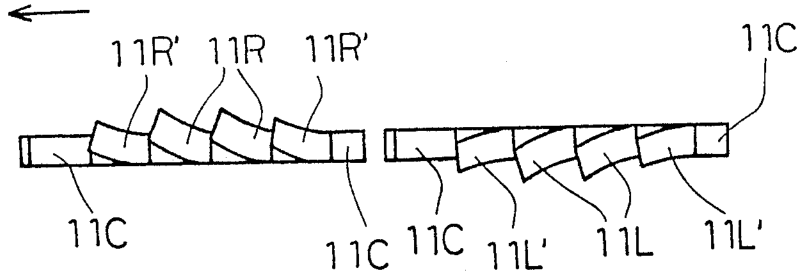
FIG. 7 is an edge view of a further mode of saw-tooth setting of the saw chain.

A second mode is preferably performed such that, as shown in FIGS. 6 and 7, the first edge of the tooth 11C of a plurality of cutting edges of teeth 11 . . . of each cutting center cutting link 1 is started from the center of the center cutting link 1 to restrict generation of a side-run torque by the first edge as much as possible and the saw-tooth setting is performed to be horizontally laterally symmetrical with each other between front and rear adjacent center links 1, 1 as shown by 11C . . . 11R; 11C . . . 11L thereby to balance horizontal cutting torques between adjacent center cutting links 1, 1.

Figure 8:
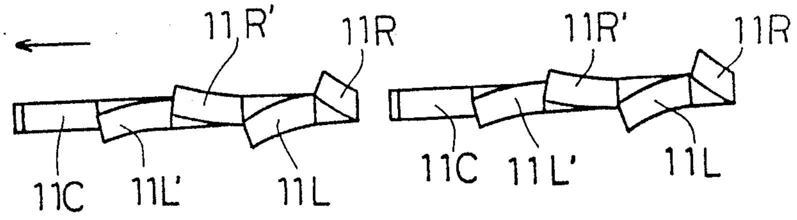
FIG. 8 is an edge view of still another mode of saw-tooth setting of the saw chain.
Figure 9:
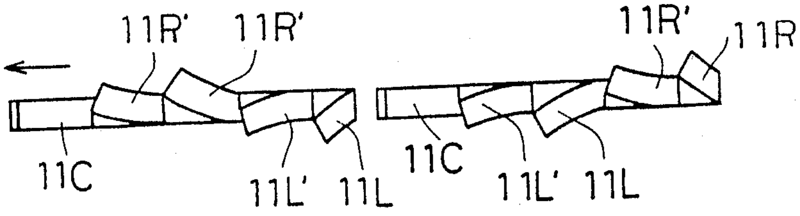
FIG. 9 is an edge view of an additional mode of saw-tooth setting of the saw chain.
Figure 10:
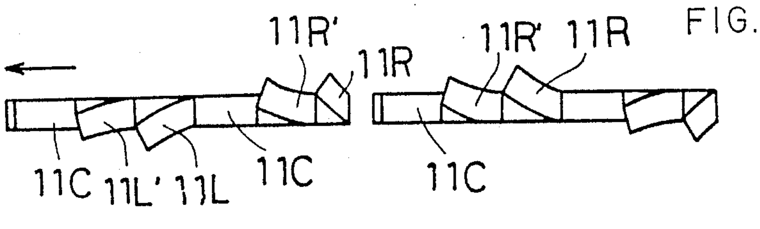
FIG. 10 is an edge view of a further additional mode of saw-tooth setting of the saw chain.

A third mode is preferably performed such that, as shown in FIGS. 8–10, the tooth 11C with first edge of each center cutting link 1 is started from the center to restrict generation of side-run torque by the first edge as much as possible, while the saw-tooth setting is selected so that the tooth width is gradually increased from the second edges of the teeth 11R, 11R', 11L, 11L' and one cycle is terminated on one link in horizontally opposite directions, to balance horizontal cutting torques.

Further, with respect to the driving function, the bottom of the chain sprocket being formed to have raised portions corresponding to notches between base portions of the center cutting links engage with the chain sprocket while the edges of the pair of guide plates are in contact with the lower side surfaces of the side links of the saw chain, whereby the saw chain is engaged with the chain sprocket as a whole, to be rotatably driven without causing sliding.

(Possibility of Industrial Utilization)

As hereinabove described, the compact chain saw according to the present invention is useful for handily cutting tube materials and slab materials made of relatively hard synthetic resin, soft metal and concrete materials and capable of cutting off existing wall surfaces in particular, whereby the same can be widely used as a handy chain saw for various work.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A chain saw comprising:

a support including a handle;

a guide bar mounted on said support, said guide bar having guide grooves being partially defined by inner peripheral edges providing a sliding surface, said guide bar having side edges located on either side of said guide grooves;

a sprocket rotatably mounted on said support;

drive means for rotatably driving said sprocket; and an endless saw chain including a plurality of cutting links pivotably interconnected by pairs of side links, each cutting link being disposed at each end thereof between sequential pairs of side links and pivotably connected together by a pin, each said cutting link being formed with a notch for driving said saw chain by means of said sprocket, said notch being located between a pair of extended base portions on an underside of the cutting link and being provided with a plurality of teeth having cutting edges on an upper portion of the cutting link, said extended base portions slidingly engaging with said inner peripheral edges of said guide grooves of said guide bar with said side links riding said side edges of said guide grooves for preventing pivoting and lateral movement of said cutting links during operation of the chain saw, said sprocket provided with a pair of guide plates rotatable with said sprocket for supporting and guiding portions of said saw chain located below positions at which said cutting links and said side links are pivotably connected together, said sprocket further including polygonal edges having a plurality of tooth portions with a pair of bottom portions disposed between each pair of tooth portions, said bottom portions being set at an angle relative to each other for aligning with the extended base portions of said cutting links while said polygonal edges engage with and align with bottom edges of pairs of side links to ensure contact between said bottom portions and said extended portions for preventing slippage and mechanical loss during driving of the saw chain by the sprocket, said pins connecting said cutting links together with said side links at positions above the central height of each cutting link.

2. The chain saw according to claim 1, wherein an even number of cutting links are interconnected and provided around the periphery of said guide bar, each cutting link being provided with a pattern of plural cutting edges arranged at predetermined decreasing laterally displaced angles from opposing cutting edges at either end of each of said cutting links to a longitudinally centrally cutting edge of each located of said cutting links, said cutting links being arranged in a sequential order with the pattern of a preceeding cutting link being opposite to that of the immediately following cutting link for providing a pattern which arcuately traverses said endless saw chain in a serpentine pattern.

3. The chain saw according to claim 1, wherein said teeth each having a cutting edge are set so that a leading cutting edge of each cutting link is located at the center of the width of said saw chain with each succeeding cutting edge being increasingly laterally disposed on a single side of each cutting link with sequential cutting links having said increasingly laterally disposed cutting edges on alternating sides thereof along said endless saw chain.

4. The chain saw according to claim 1, wherein said teeth, each having a cutting edge, are set so that a leading cutting edge of each cutting link is located at the center of the width of said saw chain with a first group of cutting edges being increasingly laterally disposed to one side of said cutting link with respect to the center of the width of said saw chain followed by a second group of cutting edges being increasingly laterally disposed to an opposite side of said cutting link with respect to the center of the width of said saw chain.

* * * * *